(No Model.)

F. KEGEL.
MEANS FOR SETTING DIAMONDS AND OTHER STONES FOR CUTTING PURPOSES.

No. 475,778. Patented May 31, 1892.

Fig. 1ª

Fig. 1ᵇ.

WITNESSES
Arthur A. Ort.
Alice F. Brooks.

INVENTOR
Fritz Kegel.
by Frank L. Dyer,
Attorney

UNITED STATES PATENT OFFICE.

FRITZ KEGEL, OF BRESLAU, GERMANY.

MEANS FOR SETTING DIAMONDS AND OTHER STONES FOR CUTTING PURPOSES.

SPECIFICATION forming part of Letters Patent No. 475,778, dated May 31, 1892.

Application filed January 5, 1892. Serial No. 417,091. (No model.)

*To all whom it may concern:*

Be it known that I, FRITZ KEGEL, gentleman, a subject of the German Emperor, and a resident of 8 Höfchen Strasse, Breslau, in the Province of Silesia and German Empire, have invented a certain new and useful Improved Means for Setting Diamonds and other Stones for Cutting Purposes, of which the following is a full, clear, and exact specification.

My invention relates to an improved method of setting diamonds and other stones for cutting purposes in appropriate cutting-tools by means of conical bolts, which said bolts are arranged in the tools and combined with a cap and covering or surface-plate.

Figure 1:
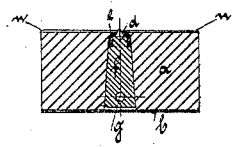
Figure 1:
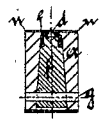
Figure 1:
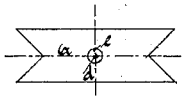
Figure 2:
Figure 3:
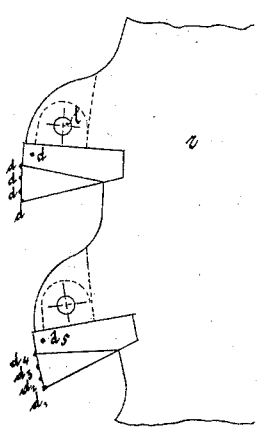
Figure 3:

Figures 1, 1$^a$, and 1$^b$ represent in vertical section and top view my improved method of setting stones. Fig. 2 is an elevation of the bolt $f$. Fig. 3 represents in side and edge view the cutting-tools forming a part of a circular saw.

The stone $d$ to be set is laid in the cavity of the bolt $f$ and the cap $e$ screwed onto the same, the conically-turned bolt $f$ fitting in the conical boring of the tool $a$, of Wolfram metal, and the upper surface being completed by a piece of sheet metal $b$, soldered to the tool or tooth of the circular or other saw for cutting stone, &c. In order to prevent the stones from falling out, each stone in the bolt $f$ is securely held by a surface-plate $n$, hardened in mercury, the bolt $f$ being held by the pin $g$.

If it is desired to set the stones in the tools or cutters $a$ into a circular or frame saw-blade, I proceed as follows: The teeth of the saw-blade, Fig. 2, are at their outer end slotted to receive the tool or cutter $a$, the latter being provided with a slotted shank, in which the pin $t$ is fixed. The tool or cutter $a$ is so formed that the stone $d$ first comes into contact with the surface to be cut and is followed by the stones $d^2$, $d^3$, and $d^4$, whereas the laterally-arranged stones $d^5$ give the cut the proper breadth.

This universal stone-cutting tool can be employed in all kinds of saws or other implements for cutting stone and the like, such as boring and other tools.

Having now fully described my said invention, I declare that what I claim, and desire to secure by Letters Patent, is—

My improved means of setting diamonds and other cutting-stones in tools or cutters $a$, by means of conical bolts $f$, caps $e$, and surface-plates $n$, substantially as and for the purpose specified.

In witness whereof I have hereunto signed my name in the presence of two subscribing witnesses.

FRITZ KEGEL.

Witnesses:
   HELENE CZERWENKA,
   THEODOR SHUMMEL.